United States Patent
Daniel et al.

(10) Patent No.: US 7,734,738 B2
(45) Date of Patent: Jun. 8, 2010

(54) AUTOMATIC CONFIGURATION OF CLIENT AND SERVER NETWORKING

(75) Inventors: Sean David Daniel, Redmond, WA (US); Leszek Mazur, Bellevue, WA (US); Adam C. DePue, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/654,080

(22) Filed: Jan. 17, 2007

(65) Prior Publication Data

US 2008/0172476 A1 Jul. 17, 2008

(51) Int. Cl.
*G06F 15/177* (2006.01)
(52) U.S. Cl. ............... 709/220; 709/221; 709/230; 370/389
(58) Field of Classification Search ............ 709/220, 709/230; 370/389
See application file for complete search history.

(56) References Cited

U.S. PATENT DOCUMENTS

| | | | |
|---|---|---|---|
| 5,974,461 A | 10/1999 | Goldman et al. | |
| 6,131,119 A | 10/2000 | Fukui | |
| 6,466,981 B1 | 10/2002 | Levy | |
| 6,629,145 B1 * | 9/2003 | Pham et al. | 709/230 |
| 6,842,769 B1 | 1/2005 | Kim et al. | |
| 6,931,558 B1 | 8/2005 | Jeffe et al. | |
| 7,039,682 B2 | 5/2006 | Baitinger et al. | |
| 2003/0081621 A1 | 5/2003 | Godfrey et al. | |
| 2004/0015572 A1 | 1/2004 | Kang | |
| 2004/0210649 A1 | 10/2004 | Bhogal et al. | |
| 2005/0198215 A1 | 9/2005 | Helmerich | |
| 2005/0256939 A1 | 11/2005 | Naismith et al. | |
| 2007/0014285 A1 * | 1/2007 | Kurihara et al. | 370/389 |

OTHER PUBLICATIONS

Guttman, Erik, "Zero Configuration Networking", http://www.isoc.org/inet2000/cdproceedings/3c/3c_3.htm.
FreeBSD Handbook, Chapter 25, Network Servers, "25.5 Automatic Network Configuration (DHCP)", 6 pages, May 2006.
www.informit.com, "Managing Client Network Configuration", 3 pages, last updated Aug. 25, 2006.
www.cisco.com, PIX/ASA as a DHCP Server and Client Configuration Example, 14 pages, Jul. 17, 2006.
www.informit.com, "Managing Client Network Configuration", 2 pages, last updated Jan. 1, 2004.

* cited by examiner

*Primary Examiner*—Tammy T Nguyen

(57) ABSTRACT

Described is a technology by which a server automatically configures itself for adding to an existing network. Upon connection to the network, the server obtains settings including existing subnet and gateway IP addresses from a DHCP assigned IP configuration (e.g., a router). The server uses the settings to automatically configure itself to dynamically provide addresses similar to the previous scope to clients. In one implementation, the server software sets its network card to a static IP address state while the server is configured, and thereafter sets the network card to a dynamic state. The router is disabled during server configuration, and re-enabled thereafter, whereby the server DHCP service instead of the router DHCP service assigns the addresses. The server may also attempt to automatically connect to the Internet.

16 Claims, 4 Drawing Sheets

AUTOMATIC CONFIGURATION OF CLIENT AND SERVER NETWORKING

BACKGROUND

Adding a server to an existing network has heretofore required a manual process to configure the internal network and connect to the Internet. The process, typically performed via a wizard or applet, requires that the end user or server administrator have knowledge of the existing infrastructure in order to set up the connection to the local area network (LAN), and knowledge of how to access the Internet.

For example, an end user or a server administrator is required have knowledge of available IP (Internet Protocol) addresses on their network, subnet masks, gateways and DHCP (Dynamic Host Configuration Protocol) servers. Such knowledge is beyond the sophistication level of many individuals that would otherwise be interested in adding a server, e.g., to a small business network and even to a home network.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a server obtains settings from a DHCP assigned IP configuration (e.g., a router) upon coupling to a network. The server uses the settings to automatically configure the server for dynamically providing addresses to clients coupled to the network.

In one implementation, the server's network card is set to a static IP address state to allow the server to be configured for dynamically providing addresses. Afterwards, the server's network card is set to a dynamic state to discover the network. Other applications, such as one that promotes a server to a domain controller, may also be installed during the static state.

To automatically configure the server, the server detects data corresponding to the DHCP assigned IP configuration (e.g., a router) when the server is coupled to the user network. The data, for example corresponding to existing subnet and gateway IP addresses, are stored, and used to configure the server for assigning addresses upon DHCP requests from clients. The router or the like may be disabled during server configuration, and re-enabled thereafter, whereby the server's DHCP service instead of the router's DHCP service assigns the addresses. The server may also attempt to automatically connect to the Internet. As such, the server is automatically configured for networking in the existing network.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards adding a server to an existing network, in which the server is automatically integrated into an existing network. For example, a server by default requires static IP addresses such that user computers can find it on the local LAN. As described below, via the technology herein, the server is preconfigured ("out of the box" from the user's perspective) to use DHCP assigned IP addresses. In general, the server plugs into the local LAN, and an available DHCP assigned IP address is acquired from the existing network, including subnet, gateway and DHCP server. The settings from the DHCP server are saved locally on the server, and when the existing DHCP server (in a small business, usually on an existing router) is disabled, these settings are used to configure the server's networking services, including the server's DHCP service, to match the existing network, causing zero interruption in network connectivity for client computers.

In one example implementation, a server is in an environment in which a domain is configured, whereby the server acts as a domain controller. _Notwithstanding, it can be readily appreciated that instead of a domain configuration, any other networking environment, such as peer-to-peer or even an unknown environment may benefit from the technology described herein.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
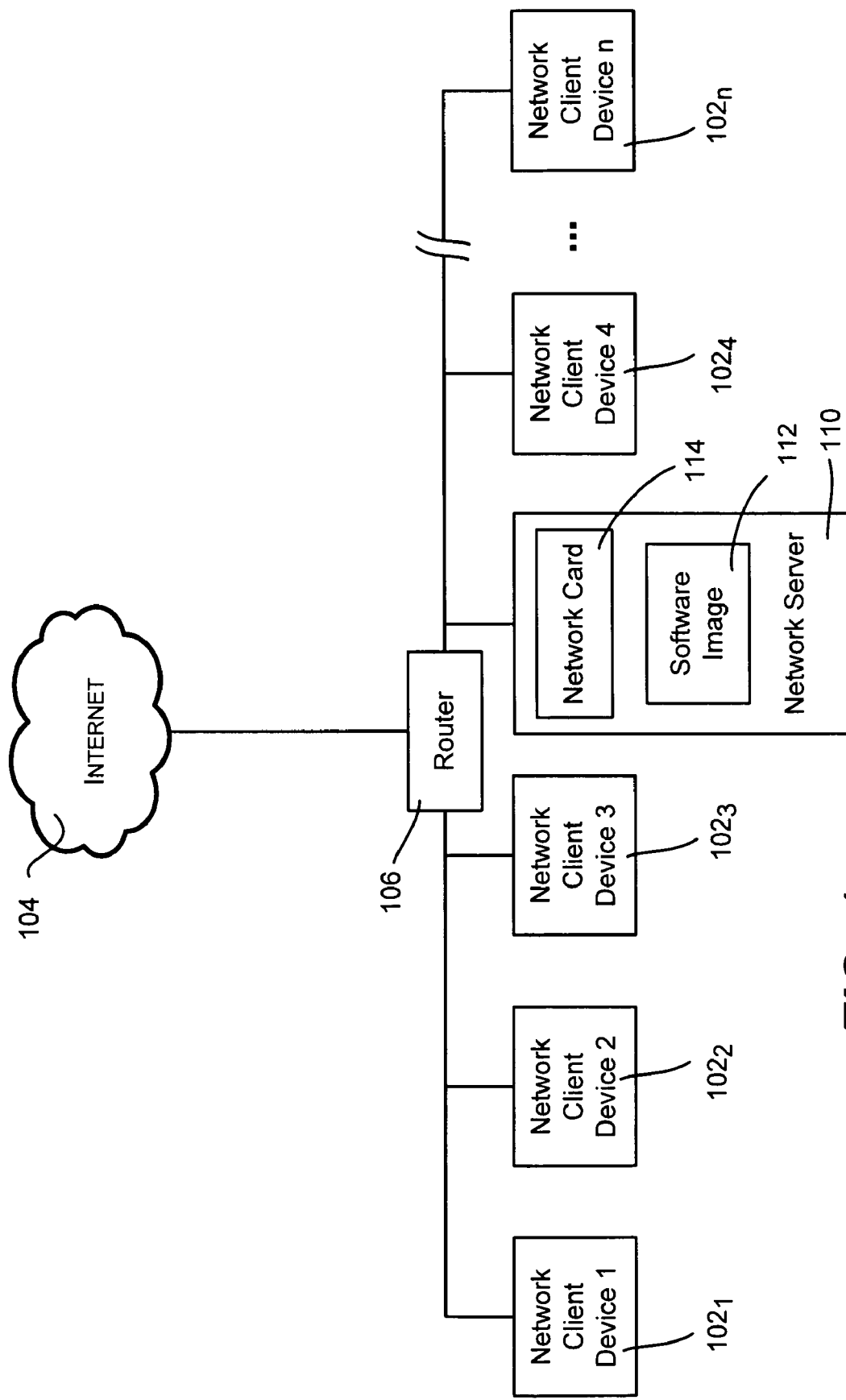
FIG. 1 shows an illustrative example of a general-purpose network computing environment into which various aspects of automatic networking configuration may be incorporated.

FIG. 1 shows an example network arrangement for a hypothetical business or home, in which a number of computing devices $102_1$-$102_n$ are coupled to one another and to the internet 104 via a router 106. The computing devices $102_1$-$102_n$ may be any device capable of running code and/or containing logic. Note that the technology described herein may apply to many other products and configurations, including one a peer-to-peer network, or more complex configurations. For example, although not shown in FIG. 1, it is understood that various other networking components may be present, e.g., other routers, switches, hubs, modems, and hardware-based firewalls.

As described below, a network server 110 including a software image 112 for server/networking functionality and a network card 114 is coupled to the network, such as when received from a manufacturer. As also described below, the network server is arranged for automatic configuration to work in the existing network, by discovering certain information.

Figure 2:
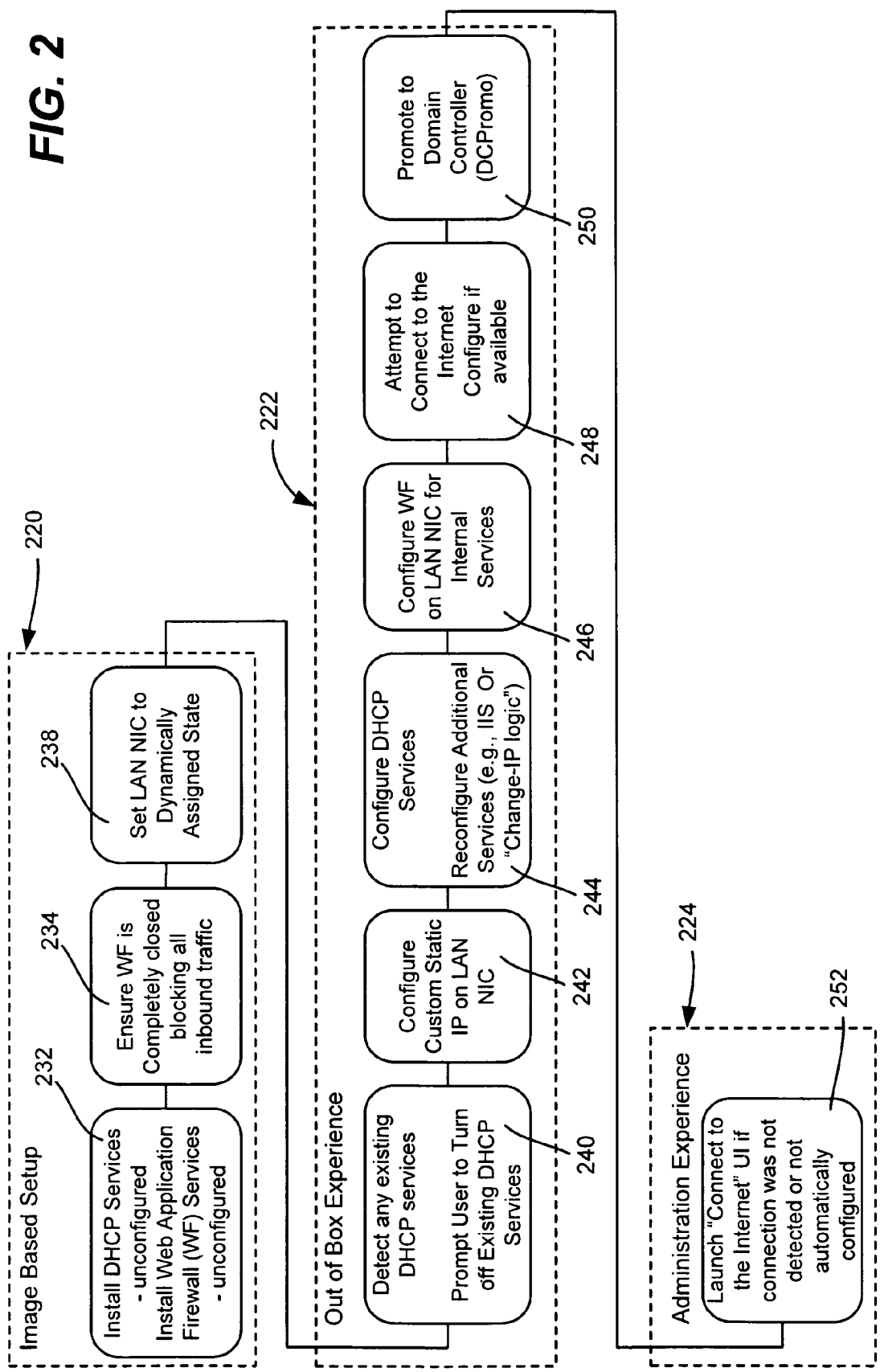
FIG. 2 is a flow diagram representing various components and operations therein in automatically configuring a server for adding to a network.

In one example implementation generally represented in FIG. 2, there are three primary phases of an image-based setup infrastructure. Initially there is a staging area where the server software is installed into an image, referred to herein as image based setup 220. Following image based setup 220, the server image 112 (FIG. 1) is shipped to a customer/user, such as by being preinstalled on the server hardware, e.g., by the server's manufacturer or a third party, or on a DVD or other suitable medium from which the software image 112 may be copied to the server. In general, this phase is referred to herein as the "out of box experience" 222, in which the user performs actions to customize the image for their business or home. Once completed, the user is transitioned seamlessly into a third phase, referred to as the administration experience 224.

As represented in FIG. 2, in the image based setup 222, the server's DHCP services and web application firewall (WF) services are installed in an unconfigured state (step 232). Step 234 closes the firewall to block incoming traffic, and step 234 sets the LAN NIC to a dynamically assigned state. At this point, the image is shipped to the user.

When received by the user, the user couples the server 110 to the existing network's router 106, installing the image 112 from accompanying media if not preinstalled. In general, the server will detect any router (or routers), get the router's settings, disable the DHCP service on the router and re-enable the DHCP service on the server 110. For example, the server can discover a router on one of five well-known subnets, e.g., corresponding to 192.168.x.xxx.

More particularly, the out of box experience phase 222 includes step 240 in which the server detects any existing DHCP services, (each such service typically corresponding to a router), and prompts the user to turn the detected DHCP services off. Note that if a protocol is present that allows a service to be turned off automatically by the server, the user need not be prompted for that service. At step 242, the server then sets its network card (LAN NIC) to a static state, whereby it can configure its own DHCP services, as well as reconfiguring any additional services that require a static IP address, e.g., Microsoft Corporation's Internet Information Server or other IP changing logic.

For example, the server 110 may acquire the network settings from the existing DHCP server (e.g., router) on the network using the standard DHCP protocol. The configuration details acquired from the existing DHCP server are stored, and once the existing DHCP server is disabled, the server 110 configures its once dynamic IP settings to static IP address settings, maintaining the existing subnet and gateway IP addresses. The local DHCP service on the server 110 is enabled, building a DHCP scope within the acquired subnet mask, whereby the server answers DHCP requests from clients, handing out addresses in the same scope as the previous DHCP server. The only difference to the clients is a new DNS server.

At step 246, the firewall associated with (e.g., incorporated into) the network card 114 is configured to allow internal services to operate. Note that the firewall aids in providing security of the server 110 during the automatic network detection operations, because at this time the server 110 is otherwise in a vulnerable state. At this time, the server can set up new addresses for the various network components, e.g., upon client reboot, repair connection, or release/renew operations.

Step 248 represents an attempt to connect to the Internet 104, and configuring the various network settings for Internet access if the Internet is available. Step 250 represents the server 110 promoting itself to a domain controller, whereby the various client devices may join the domain.

At this time, the out of box experience 224 is complete, and the user is transitioned to the administration experience 224. Step 252 of the administration experience 224 represents the option of launching a user interface (e.g., a wizard) to help the user connect to the Internet if automatic connection failed at step 248.

As described above, one automatic configuration aspect of client/server networking operates by toggling the configuration type of the network card 114 between static and dynamic as needed to allow the installation of server applications that require static IP address settings. Once installed, the state of the network card 114 is changed to a dynamically assigned state.

Figure 3:
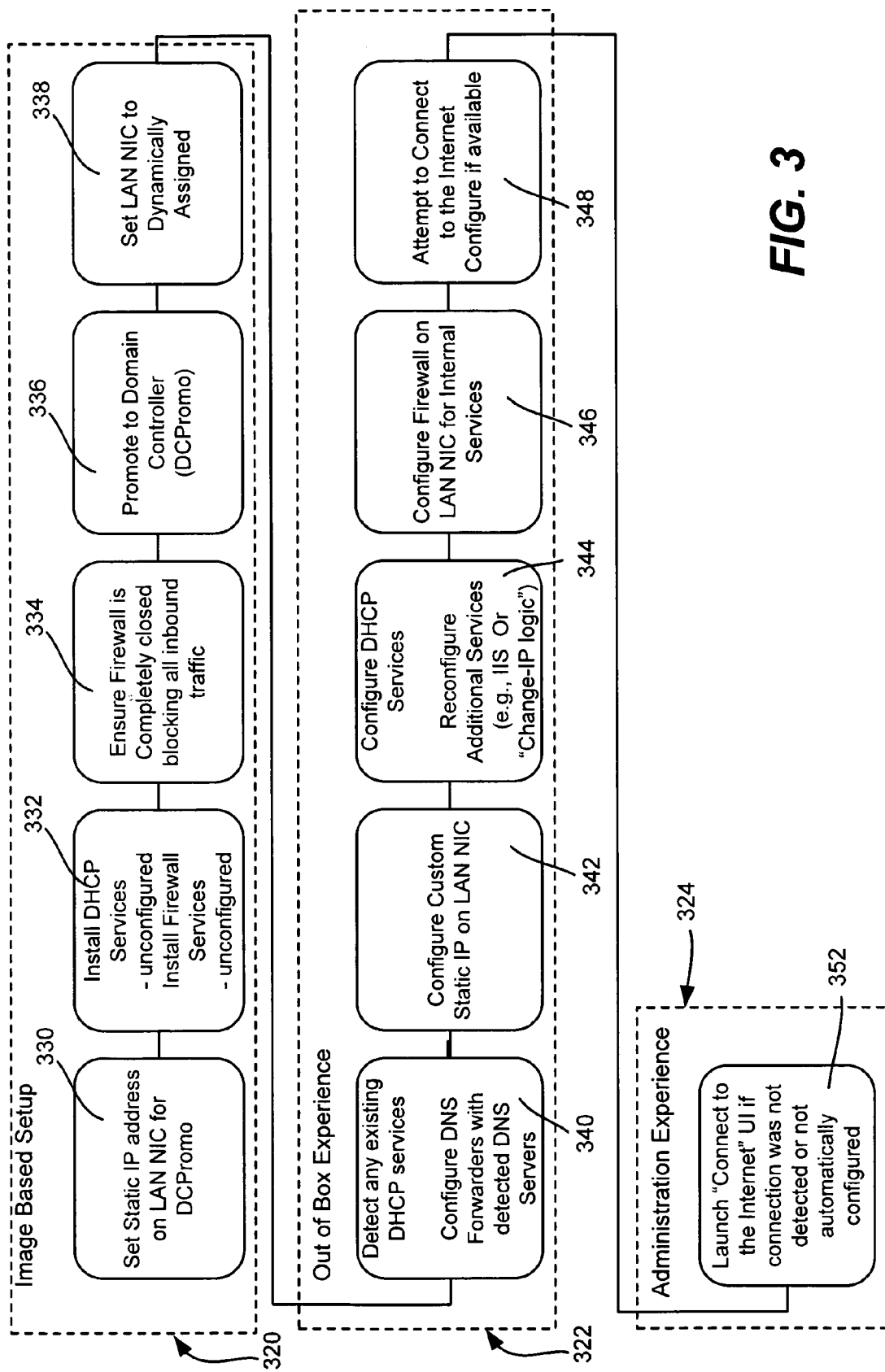
FIG. 3 is a flow diagram representing various components and alternative operations therein in automatically configuring a server for adding to a network.

FIG. 3 represents an alternative example of automatic configuration operation having three similar phases, image based setup 320, an out of box experience 322 and an administration experience 324. In image based setup 320, each component is installed before the customer receives the disk (or disks) or preinstalled image of the server.

In this example, the server components, including DHCP, DC Promo (domain controller promotion) and DNS (domain name system) that require a statically assigned IP address for the server to install are installed during image based setup. In order to satisfy these requirements, the configuration of the network card 112 is set to the static state at step 330. For example, the network card 112 of the server 110 is set to a well known static IP address (e.g., 192.168.2.16). Note that the other steps in this alternative image based setup phase 320, namely steps 332, 334 and 338, are similar to those described above with reference to FIG. 2, and are not described again herein for purposes of simplicity. However, in this alternative example of FIG. 3, note that the domain controller promotion occurs as part of the image based step 330 at step 336.

Thus, the steps in the out of box experience 322 are similar to those described above with respect to the out of box experience 222 of FIG. 2, except that the domain controller promotion (step 250) is omitted in this alternative. The administration experience 324 (step 352) is also the same as that of FIG. 2 phase 224 (step 252), and is thus not again described.

In this manner, by coupling the server to the network, the DHCP assigned IP configuration data is captured and saved when the DHCP service is turned off. The stored data is then used to configure server services such as DHCP scope settings automatically, without asking an end user for local network settings, or requiring the end user to have knowledge of how his or her network is setup.

From the client side, networking maintains function within the network. Once the DHCP assigned IP address from the router expires, as is the design of DHCP, the client makes another DHCP server request. At this time, the server 110 responds to this request, instead of the router, handing the client a new IP address, and a new DNS server. Client computers continue to function as before, but now have access to internal DNS entries and websites hosted by the server.

In the event of a non-standard network configuration, a wizard may be provided to emulate the prior method of network configuration that automatically populates in the "to do" section of an administration console. If an Internet connection is detected, this wizard is not present in the "to do" section of the console, but rather is presented as a reconfigurable wizard within the networking sections of the console.

Exemplary Operating Environment

Figure 4:
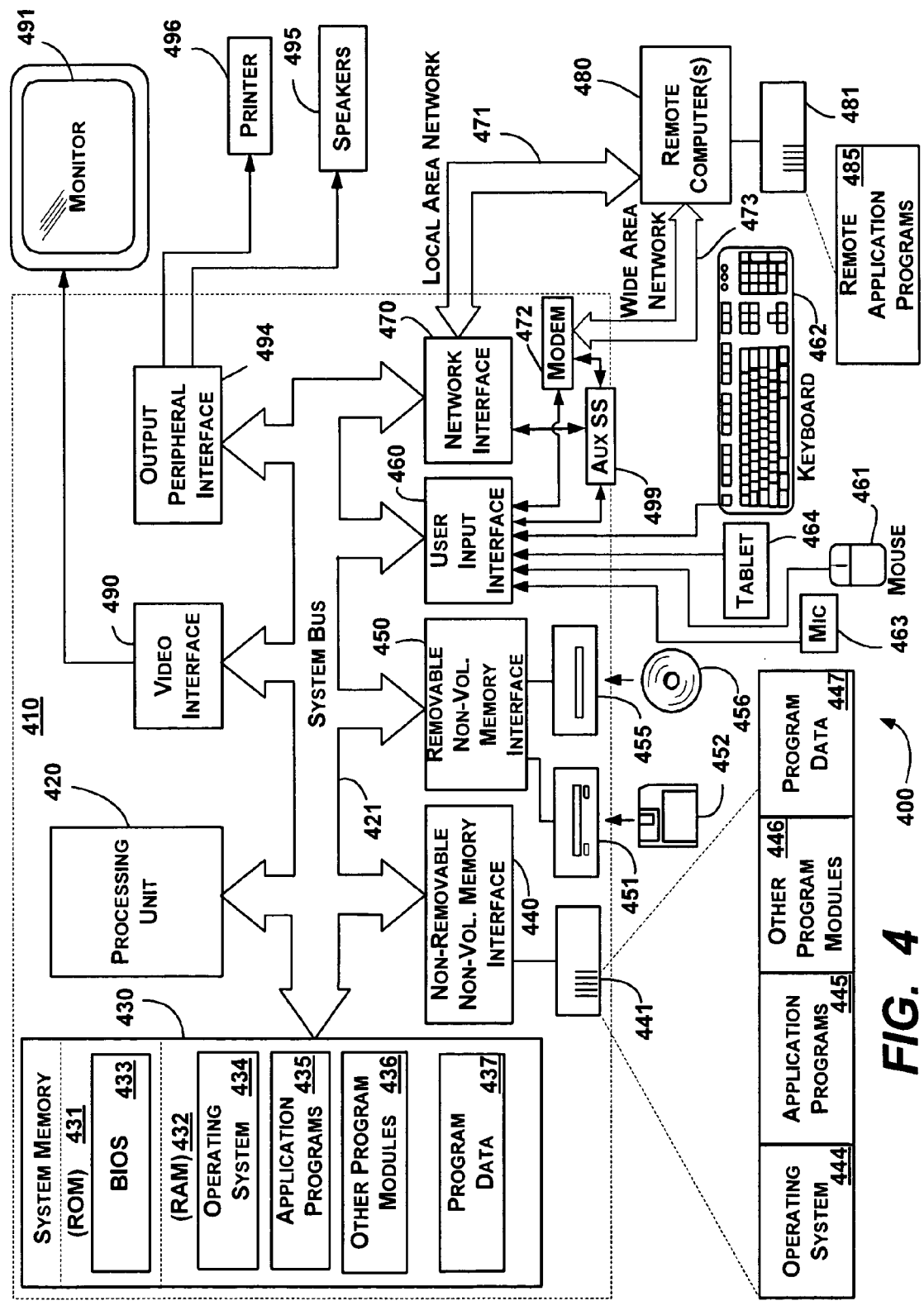
FIG. 4 shows an illustrative example of a general-purpose network computing environment into which various aspects of the present invention may be incorporated.

FIG. 4 illustrates an example of a suitable computing system environment 400 on which the server 110 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions, which when executed performs steps-acts, comprising:
   detecting data corresponding to a DHCP assigned IP configuration associated with a DHCP service of a router when a server is coupled to a user network;
   storing the data on the server; disabling the DHCP service of the router;
   using at least part of the stored data to automatically configure at least one server service;
   setting a network card of the server to a static state corresponding to a static IP address;
   installing to the server, while in the static state, at least one server application that requires a static IP address to install;
   closing a firewall to block incoming traffic;
   promoting the server to a domain controller; and
   setting the network card of the server to a dynamic state after installing the at least one server application;
   attempting to connect to the Internet without manual intervention;
   if the attempt fails, launching a mechanism by which the user can manually connect to the Internet.

2. The computer-readable medium of claim 1 wherein the step-act of installing comprises promoting the server to a domain controller.

3. The computer-readable medium of claim 1 wherein setting the network card to the static state occurs while setting up a server software image.

4. The computer-readable medium of claim 3 wherein the step-act of installing comprises promoting the server to a domain controller.

5. The computer-readable medium of claim 1 wherein installing the at least one server application comprises configuring a DHCP service of the server.

6. The computer-readable medium of claim 1, wherein storing the data comprises maintaining existing subnet and gateway IP addresses.

7. The computer-readable medium of claim 1 having further computer-executable instructions comprising, at the server, answering DHCP requests from clients, including assigning IP addresses.

8. A computer-readable storage medium having computer-executable instructions, which when executed performs acts, comprising:
   detecting data corresponding to a DHCP assigned IP configuration associated with a DHCP service of a router when a server is coupled to a user network;
   storing the data on the server disabling the DHCP service of the router;
   using at least part of the stored data to automatically configure at least one server service;
   setting a network card of a server to a static state corresponding to a static IP address;
   installing to the server, while in the static state, at least one un-configured server application that requires a static IP address to install;
   closing a firewall to block incoming traffic;
   promoting the server to a domain controller; and
   setting the network card of the server to a dynamic state after installing;
   attempting to connect to the Internet without manual intervention;
   if the attempt fails, launching a mechanism by which the user can manually connect to the Internet.

9. The computer-readable medium of claim 8 wherein installing the at least one server application comprises installing a dynamic host control protocol (DHCP) service.

10. The computer-readable medium of claim 8 wherein installing the at least one server application comprises promoting the server to a domain controller.

11. The computer-readable medium of claim 8 wherein installing the at least one server application comprises installing a domain name system.

12. The computer-readable medium of claim 8 wherein setting the network card to the static state occurs while setting up a server software image.

13. The computer-readable medium of claim 8 wherein setting the network card to the static state occurs at least once after connection to a network.

14. The computer-readable medium of claim 8 having further computer-executable instructions comprising collecting data from a connected network and automatically configuring the at least one server application based thereon.

15. A computer-readable storage medium having computer-executable instructions, which when executed performs acts, comprising:

detecting data corresponding to a DHCP assigned IP configuration associated with a DHCP service of a router when a server is coupled to a user network;
  storing the data on the server disabling the DHCP service of the router;
  using at least part of the stored data to automatically configure at least one server service;
  setting a network card of a server to a static state corresponding to a static IP address;
  installing to the server, while in the static state, un-configured dynamic host control protocol (DHCP) and firewall service applications;
  closing a firewall to block incoming traffic;
  promoting the server to a domain controller; and
  setting the network card of the server to a dynamic state after installing;
  attempting to connect to the Internet without manual intervention;
  if the attempt fails, launching a mechanism by which the user can manually connect to the Internet.

16. The computer-readable medium of claim 15 wherein setting the network card to the static state occurs while setting up a server software image.

\* \* \* \* \*